(12) United States Patent
Appleton

(10) Patent No.: US 6,551,509 B2
(45) Date of Patent: Apr. 22, 2003

(54) FEED UNIT AND FUEL FILTER FOR FEEDING FUEL

(75) Inventor: John Appleton, Cheslyn Way (GB)

(73) Assignee: Siemens AG, München (DE)

( * ) Notice: Subject to any disclaimer, the term of this patent is extended or adjusted under 35 U.S.C. 154(b) by 0 days.

(21) Appl. No.: 09/937,948

(22) PCT Filed: Feb. 2, 2001

(86) PCT No.: PCT/EP01/01106
§ 371 (c)(1),
(2), (4) Date: Jan. 7, 2002

(87) PCT Pub. No.: WO01/57387
PCT Pub. Date: Aug. 9, 2001

(65) Prior Publication Data
US 2002/0153300 A1 Oct. 24, 2002

(30) Foreign Application Priority Data
Feb. 2, 2000 (DE) .......................... 100 04 357

(51) Int. Cl.$^7$ ...................... B01D 29/05; B01D 35/027; F02M 37/02
(52) U.S. Cl. ...................... 210/416.4; 210/232; 210/477
(58) Field of Search ............................. 210/416.4, 232, 210/477, 482

(56) References Cited

U.S. PATENT DOCUMENTS

| | | | |
|---|---|---|---|
| 2,625,114 A | * | 1/1953 | Coffey ........................ 137/393 |
| 2,744,466 A | * | 5/1956 | Difford ........................ 137/549 |
| 4,556,490 A | * | 12/1985 | Kemmner et al. .......... 123/511 |

FOREIGN PATENT DOCUMENTS

| | | |
|---|---|---|
| DE | 198 16 689 A1 | 10/1999 |
| DE | 199 46 024 A1 | 7/2000 |
| EP | 0 846 586 A2 | 6/1998 |
| FR | 2 765 632 | 1/1999 |

* cited by examiner

Primary Examiner—Fred Prince
(74) Attorney, Agent, or Firm—Cohen, Pontani, Lieberman & Pavane

(57) ABSTRACT

A feed unit for feeding fuel includes a baffle having a bottom region defining a partial region. A filter having a filter fabric covers the region. The fuel pump inlet is connected for receiving fuel from the partial region via a connection through the filter fabric.

7 Claims, 3 Drawing Sheets

FEED UNIT AND FUEL FILTER FOR FEEDING FUEL

BACKGROUND OF THE INVENTION

1. Field of the Invention

The invention relates to a feed unit for a fuel tank, in particular for a motor vehicle, the feed unit including a baffle, with a fuel pump and with a filter preceding the fuel pump.

2. Description of the Prior Art

Feed units which are to be used in fuel tanks and by means of which fuel is fed from the tank to the internal combustion engine of the motor vehicle are generally known and are therefore state of the art. The fuel pump arranged in the baffle sucks in the fuel from the baffle via the filter. Impurities in the fuel are to be prevented by means of the filter from passing into the fuel pump and from there to the internal combustion engine.

DE 36 09 906 A1 discloses a filter of this type. It consists of a tubular filter fabric which is connected to a connection piece and via which the filter is fastened to the inlet port of the fuel pump. The filter is led as far as the bottom of the tank, so that, even when the liquid level is low, fuel can be sucked in by the fuel pump over part of the filter fabric. In order to avoid the filter being contracted as a result of the suction effect of the fuel pump, thereby impairing the filter action, a supporting body is inserted into the filter fabric and prevents the filter from being contracted.

The complicated manufacture of the filter is a particular disadvantage. Thus, the insertion of the supporting body, the shaping of the filter fabric into its final shape and the welding of the edges of the filter fabric necessitate a multiplicity of work steps. In addition, there is the orientation of the filter during the mounting of the latter in the tank.

SUMMARY OF THE INVENTION

The object of the present invention is to provide a filter for a fuel pump of the type initially mentioned which has a better filter capacity, is simple to produce and can be mounted easily.

This object is met according to the invention, in that the filter is integrated into the baffle of the feed unit. Part of the baffle is in this case an integral part of the filter in that it is covered by the filter fabric. This part of the baffle thus forms the filter housing. The decisive advantage is that the useful filter surface is enlarged, thus entailing an improved filter capacity. In addition, in this case, the fuel also passes into the filter as a result of gravity, no longer solely due to the suction capacity of the fuel pump. A tubular closed configuration of the filter fabric being avoided, the production of the filter fabric is appreciably simpler and therefore, cost-effective.

In an embodiment of the present invention, the filter fabric covers a part region of the bottom of the baffle. A particularly reliable fuel supply is ensured when this part region is the lowest region of the baffle. The part region may at the same time have a step-shaped or outwardly curved design. In the case of a baffle without an orifice in the bottom, the entire bottom is advantageously covered by the filter fabric. A particularly large filter surface is thereby obtained.

In order to prevent the filter from being contracted, it is advantageous to arrange supporting elements between the baffle and the filter fabric. A favorable configuration is obtained when these supporting elements, ribs, are connected to the baffle. The supporting elements may both be snapped in and be integrally molded. In another configuration, the supporting elements are arranged on the filter fabric and support the latter against the baffle.

The fastening of the filter fabric in the baffle becomes particularly simple when the filter fabric is surrounded by a frame. Latching elements arranged on the frame make particularly simple mounting possible when they are snapped together with latching points in the baffle. An even simpler refinement, with the filter fabric being sealed off effectively relative to the baffle, is obtained when the frame is snapped into a peripheral groove arranged in the baffle.

In another refinement, the frame is made of plastic and is inserted in a receptacle of the baffle. As a result of the swelling of the plastic, the frame is pressed together with the receptacle, so that the sealing effect occurs.

It is also advantageous to insert the filter fabric into the baffle and fasten it to the baffle by means of a holding ring. In a further refinement, the filter fabric is welded to the baffle. Support, at the same time with the filter fabric being fixed, is achieved in that the supporting elements have latching points, into which latching elements arranged on the filter fabric engage.

BRIEF DESCRIPTION OF THE DRAWINGS

The invention permits numerous embodiments and, to make its basic principle even clearer, is illustrated in the drawings in which.

DETAILED DESCRIPTION OF THE PREFERRED EMBODIMENT

Figure 1:
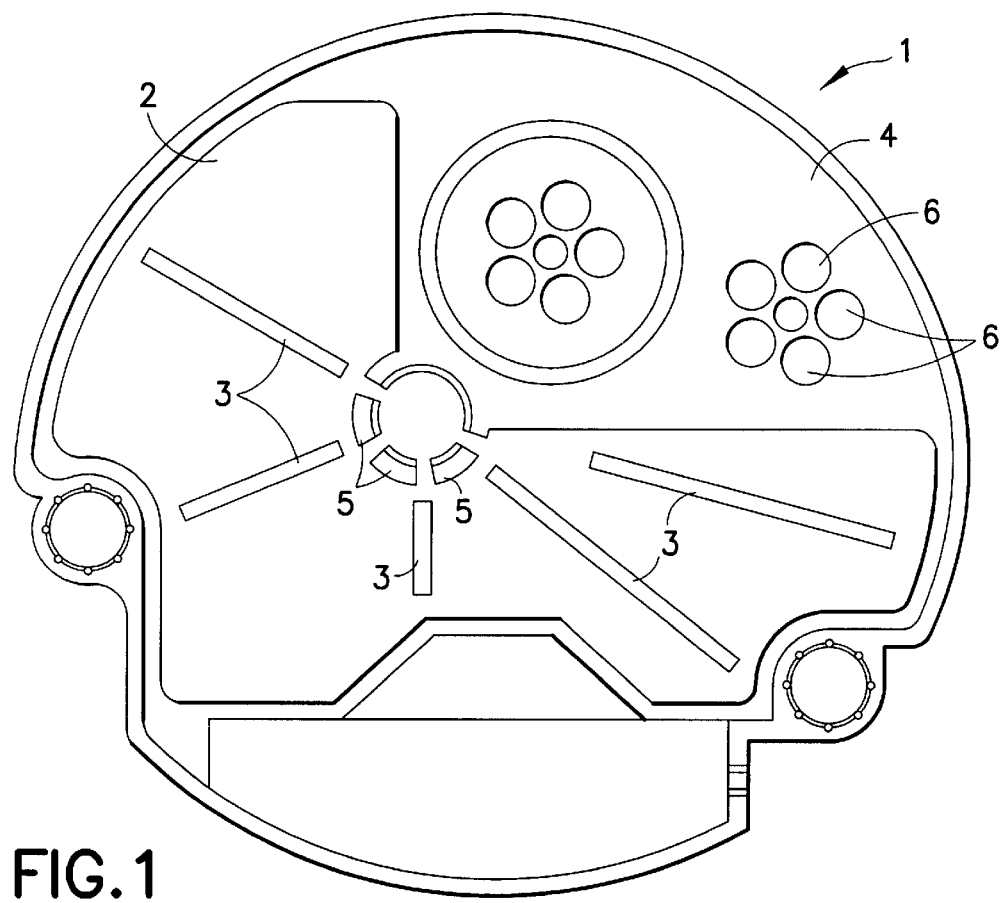
FIG. 1 is a top view of a baffle.

FIG. 1 shows a battle 1 produced by the injection molding method. The part region 2 forms the lowest region of the bottom. Vertical ribs 3 are integrally molded in this part region 2 as supporting elements which extend to a height corresponding to the level of the part region 4. Elements 5 likewise integrally formed in the baffle 1 serve for receiving and supporting the filter. By the elements 5 being arranged in an interrupted manner, the fuel can flow, unimpeded, into the region of the intake pipe. Fuel passes out of the fuel tank, not illustrated, into the baffle 1 via orifices 6 in the bottom of said baffle 1.

Figure 2:
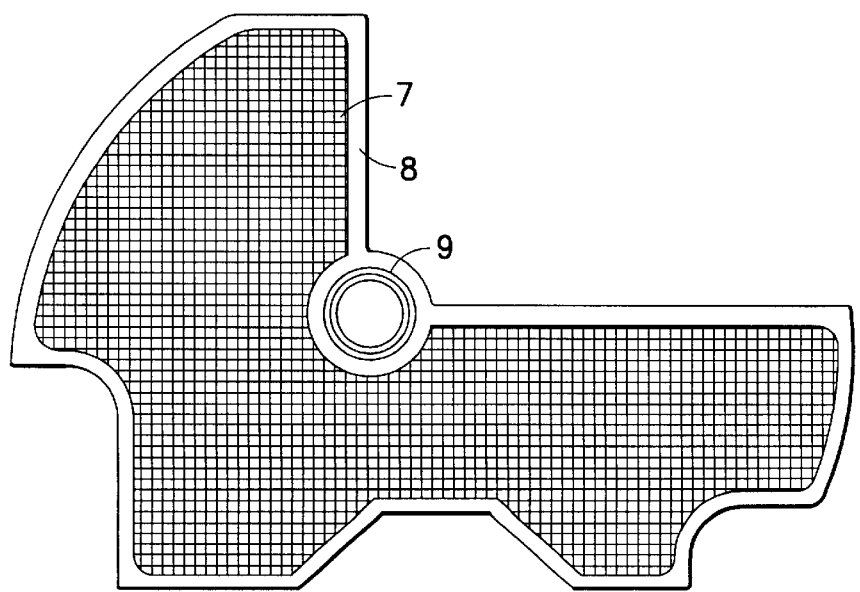
FIG. 2 is a top view of a filter fabric according to the invention.

The filter fabric 7 according to FIG. 2 has a shape matched to the part region 2 from FIG. 1. Plastic is injection-molded around the filter fabric 7 on the circumference of the latter, so that a frame 8 is formed. A connection piece 9 integrally molded in one piece with the frame serves for connecting the filter to the fuel pump.

Figure 3:
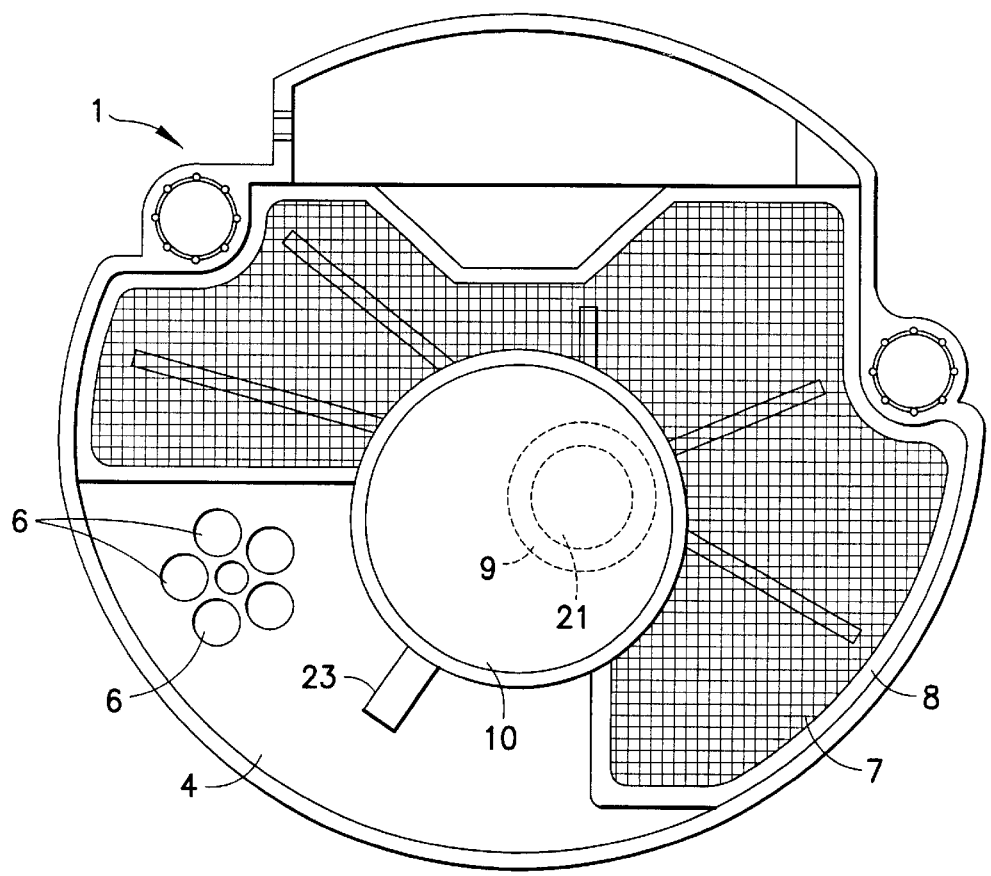
FIG. 3 is a top view of the filter fabric of FIG. 2 in the mounted state on the baffle of FIG. 1.

FIG. 3 shows the filter in the mounted state. The fuel is fed to the internal combustion engine by means of a fuel pump 10 which includes an inlet and an outlet (not shown in the Figures). To seal off the filter, the frame 8 is welded to the edge of the part region 4 surrounding the part region 2.

Figure 4:
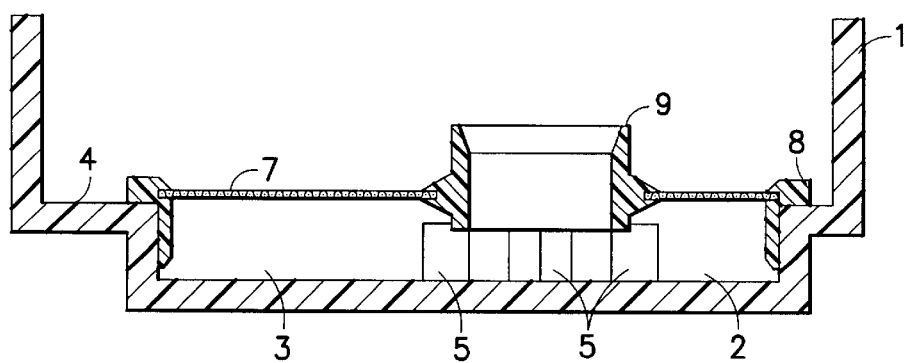
FIG. 4 is a side view of the filter according to the invention.

The filter in FIG. 4 is inserted with its frame 8 into the part region 4 in such a way that the filter fabric 7 covers the part region 2. Swelling caused by the absorption of liquid by the plastic ensures a leaktight fit. The connection piece 9 is supported on the elements 5, while the supporting elements 3 prevent the filter fabric 7 from sinking.

Figure 5:
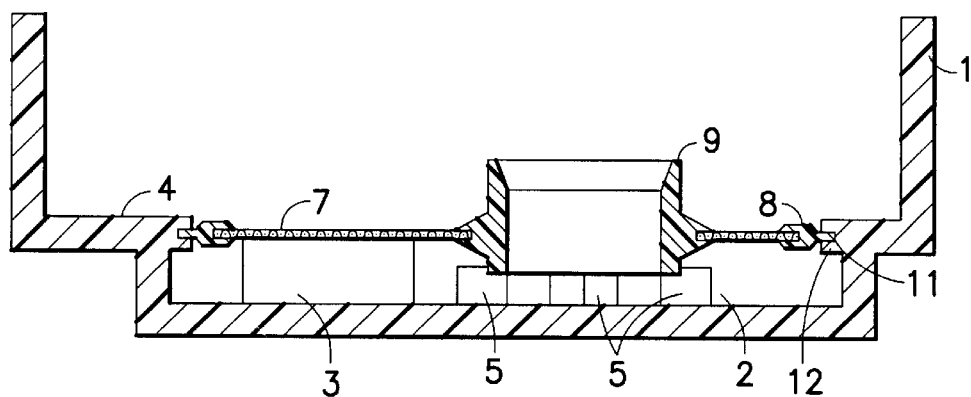
FIG. 5 is a side view of showing an embodiment of fastenings of the filter fabric to the baffle.
Figure 6:
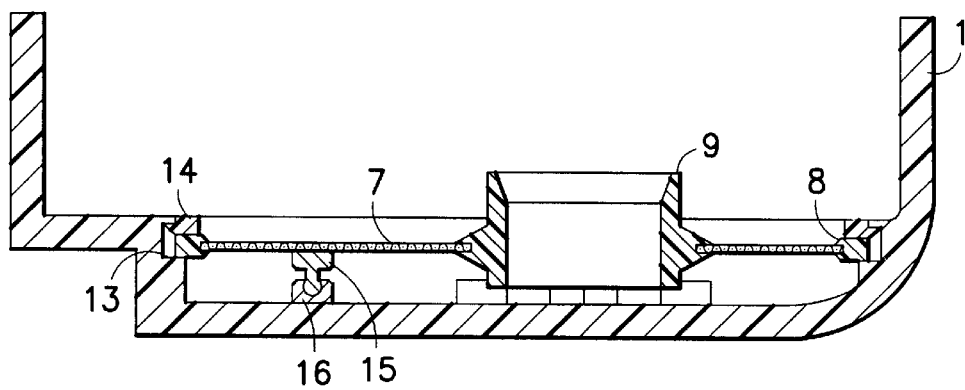
FIG. 6 is a side view of another embodiment of fastening the filter fabric to the baffle.

The fastening of the filter is illustrated in FIGS. 5 and 6. In this regard, the frame 8 according to FIG. 5 has a peripheral latching element 11, for example a hook or bead, which is pushed or snapped in a latching point 12, for example a groove, likewise peripheral along the edge of the part region 4. FIG. 6 shows another type of fastening. The filter fabric 7 or the frame 8 is laid onto a peripheral bearing surface 13. The holding ring 14 is subsequently mounted, which fixes the filter fabric 7 or the frame 8 in its position and has the effect of sealing off. The fastening of the holding ring 14 may take place likewise over its entire circumference in a similar way to FIG. 5 or by means of individual fastening elements. Latching elements 15 additionally integrally molded on the filter fabric 7, in interaction with latching elements 16 fix and support the filter fabric in relation to the part region 2.

What is claimed is:

1. A feed unit for feeding fuel, comprising:
   a baffle defining a partial region;
   a fuel pump; and
   a filter having a filter fabric covering said partial region of said baffle and connected to said fuel pump, wherein fuel flows to said fuel pump from said partial region defined by said baffle and covered by said filter fabric such that said partial region is an integral part of said filter.

2. The feed unit of claim 1, wherein said baffle comprises a bottom and said partial region is arranged on said bottom of said baffle.

3. The feed unit of claim 1, further comprising support elements connected between said partial region of said baffle and said filter fabric for supporting said filter fabric.

4. The feed unit of claim 1, wherein said filter further comprises a frame surrounding said filter fabric.

5. The feed unit of claim 4, wherein said frame is welded to said baffle.

6. The feed unit of claim 4, further comprising latching elements on said filter and said baffle, wherein said filter is connected to said baffle by said latching elements.

7. The feed unit of claim 4, further comprising a fastening element connected to said baffle for holding said frame in said baffle.

* * * * *